Patented Dec. 20, 1949

2,491,709

UNITED STATES PATENT OFFICE 2,491,709

PREPARATION OF RUBBER AND PLASTICS IN CELLULAR FORM BY MEANS OF DINITROSOAMINO COMPOUNDS

Arthur Stanley Briggs and Godfrey Edward Scharff, Blackley, Manchester, England, assignors to Imperial Chemical Industries Limited, a corporation of Great Britain No Drawing. Application November 1, 1945, Serial No. 626,176. In Great Britain November 3, 1944

8 Claims. (Cl. 260—724)

This invention relates to the production of rubbers and plastics in sponge-like or cellular form.

It is already known to produce natural and synthetic rubbers and synthetic organic plastics in sponge-like or cellular form by various processes, of which one of the simplest and most effective is that of intimately mixing a heat-decomposable substance such as diazoaminobenzene or sodium bicarbonate with the rubber or plastic and heating the mixture, whereupon the resulting gas causes the formation of cells or other small spaces in the rubber or plastic.

Diazoaminobenzene however yields materials which cause staining and sodium bicarbonate gives materials with uneven pore structure.

We have now found that diazoaminobenzene, sodium bicarbonate and other substances previously used can be replaced with advantage by organic compounds containing two or more nitrosoamine groups but not containing any aryl or substituted aryl radicals.

The advantages of these nitrosamines over compounds previously used include one or more of the following:

(a) Easy dispersibility in the rubbers and plastics.

(b) Production of non-staining materials.

(c) Production of materials which are not coloured by the nitrosamines used.

(d) Production of materials having uniform fine pore structure.

The invention accordingly comprises a process for the production of natural and synthetic rubbers and synthetic organic plastics in sponge-like or cellular form which includes as essential steps (1) the intimate incorporation with the rubber or plastic of a small proportion of an organic compound containing two or more nitrosamine groups but not containing any aryl or substituted aryl radicals, and (2) a subsequent heat treatment to decompose the organic compound. The invention also comprises the product so made.

The said organic compounds include, inter alia the polymethylene nitrosamines, e. g., di-N-nitrosopentamethylenetetramine, di-N-nitrosopiperazine and trimethylenetrinitrosamine, and compounds containing two or more groups of formula —CO.N(alkyl) NO e. g. succin-bis(N-nitrosomethylamide).

In the term rubbers and plastics we include inter alia natural rubber and synthetic rubber-like materials, e. g. synthetic rubbers obtained by polymerising 2-chlorobutadiene-1:3 or butadiene- 1:3 and styrene or butadiene-1:3 and acrylonitrile or butadiene-1:3 and methyl methacrylate, also isocyanate modified polyester amides, and similar products, also synthetic resins, e. g. phenolformaldehyde resins, urea-formaldehyde resins, alkyd resins, acrylic resins and vinyl resins.

In making cured rubbers in sponge-like or cellular form, the rubber may be mixed with a curing agent and the nitrosamine compound and the mixture heated to effect sponge formation and curing, and in making synthetic resins in sponge-like or cellular form a resin monomer or partially polymerised resin may be mixed with the nitrosoamine and the mixture heated to effect polymerisation and sponge formation.

The following examples in which parts are by weight illustrate but do not limit the invention.

Example 1

Pale rubber crepe (100 parts by weight) is plasticised by milling with thio-β-naphthol (0.6 part by weight) for 30 minutes at 100° C.

From this milled and plasticised rubber, the following stocks are compounded, the numbers being parts by weight.

| Stock | A | B | C | D | E |
|---|---|---|---|---|---|
| Milled and plasticised rubber | 100.6 | 100.6 | 100.6 | 100.6 | 100.6 |
| Zinc oxide | 5.0 | 5.0 | 5.0 | 5.0 | 5.0 |
| Whiting | 60.0 | 60.0 | 60.0 | 60.0 | 60.0 |
| Stearic acid | 5.0 | 5.0 | 5.0 | 5.0 | 5.0 |
| Petroleum jelly | 15.0 | 15.0 | 15.0 | 15.0 | 15.0 |
| Sulphur | 3.0 | 3.0 | 3.0 | 3.0 | 3.0 |
| Zinc diethyl-dithiocarbamate | 0.15 | 0.15 | 0.15 | 0.15 | 0.15 |
| 2-Mercaptobenz-thiazole | 1.0 | 1.0 | 1.0 | 1.0 | 1.0 |
| Trimethylene-trinitrosamine | 2.0 | | | | |
| Di-N-nitrosopenta-methylene-tetramine | | 2.0 | | | |
| Succin-bis(N-nitroso-methyl-amide) | | | 2.0 | | |
| Di-N-nitrosopiperazine | | | | 2.0 | |
| Diazoaminobenzene (for comparison) | | | | | 2.0 |

All the above sponge blowing agents disperse readily in the rubber. Moulds of suitable capacity are partially filled with the stocks so compounded. The stocks are then cured by heating between platens of a steam-heated press for 20 minutes at 141° C. in the usual manner.

The resulting vulcanised products are examined as to colour, fineness and uniformity of pores as well as to the extent of sponging. The sponges are held in contact with sheets of white paper, and these papers are then examined for stain caused by the sponge rubber.

The results obtained are as follows:

| Stock | Extent of blowing [1] | Colour of sponge | Blowing characteristics | Staining of paper |
|---|---|---|---|---|
| A | 120 | Stone | Close even pores | No stain after 1 month |
| B | 100 | do | do | Do |
| C | 140 | do | do | Do |
| D | 90 | do | do | Do |
| E | 100 | Buff | do | Distinct stain after 1 day |

[1] The extent of blowing is the percentage increase in volume as compared with the increase with diazoamino-benzene which is taken arbitrarily as 100.

All the sponges so produced are free from "harsh" feel, being firm and rubbery.

Example 2

GR-S rubber (a butadiene-styrene interpolymer) is softened by prolonged milling or treatment with a peptising agent, e. g. benzaldehyde phenylhydrazene.

From this milled or peptised synthetic rubber, the following mix is made:

|  | Parts |
|---|---|
| GR-S | 100 |
| Dark substitute | 25 |
| Mineral oil | 25 |
| Sulphur | 2 |
| Zinc diethyldithiocarbamate | 1.5 |
| Medium processing channel black | 5 |
| Stearic acid | 2 |
| Di-N-nitrosopentamethylenetetramine | 5 |

"Dark substitute" is brown factice, a reaction product of sulfur chloride and vegetable oils.

Moulds of suitable capacity are partially filled with this stock, which is then cured by heating for 60 minutes at 134° C. followed by 30 minutes at 141° C.

A sponge or cellular rubber is obtained, having good expansion and small, even, discontinuous pores.

Example 3

100 parts of the organic diisocyanate-modified polyester-amide described in Example 7 of British Patent 580,524 are milled for 10 minutes on cold rolls of the usual type of rubber mill, and the following ingredients compounded therewith in the usual manner:

|  | Parts |
|---|---|
| Stearic acid | 1 |
| Dibutyl phthalate | 10 |
| Devolite (a commercially available grade of China clay) | 50 |
| Vulcafor [1] VHM (commercially available compounding ingredient) | 5 |
| Vulcafor [1] VDC (commercially available compounding ingredient) | 0.75 |
| Di-N-nitrosopentamethylenetetramine | 5 |

[1] The word Vulcafor is a registered trade-mark. "Vulcafor VHM" is hexamethoxymethyl melamine, and "Vulcafor VDC" is 2,4-dichloro-alpha-naphthol.

The mix is placed in a suitable mould, so as to fill it and partially cured by heating for 35 minutes at 125° C. The mould is then opened, when the sponge forms as the pressure is released. The expansion is approximately 400%. The cure is then completed by heating the sponge in an oven for 2 hours at 125° C.

A light stone-coloured sponge of extremely fine discontinuous pore structure, and having a silky and resilient feel is obtained.

Example 4

The mix compounded as described in Example 3 is put into a suitable mould so as to one quarter fill it. It is then partially cured by heating for 35 minutes at 125° C. The mould is opened, when the sponge is found to fill it. The cure is then completed in an oven for 2 hours at 120° C.

A sponge of similar characteristics to that of Example 3 is obtained.

Example 5

The following mix is compounded in the usual manner:

|  | Parts of weight |
|---|---|
| Hycar OR-15 | 100 |
| Dibutyl phthalate | 25 |
| Sulphur | 30 |
| Mercaptobenzthiazole | 1.5 |
| Di-N-nitrosopentamethylenetetramine | 10 |

A mould of suitable capacity is partially filled with the mix and the mix cured by heating slowly up to 134° C. keeping at this temperature for 2 hours and then heating for 8 hours at 141° C.

An expanded ebonite having a fine even discontinuous pore structure is obtained.

Example 6

Neoprene synthetic rubber stocks were compounded according to the following formulae, in which parts are by weight.

|  | A | B | C |
|---|---|---|---|
| Neoprene (GR-M) | 100 | 100 | 100 |
| Phenyl alphanaphthylamine | 2 | 2 | 2 |
| Petrolatum | 3 | 3 | 3 |
| Light calcined magnesia | 4 | 4 | 4 |
| Mineral oil | 15 | 15 | 15 |
| Zinc oxide | 5 | 5 | 5 |
| Whiting | 50 | 50 | 50 |
| Diazoaminobenzene | 2 |  |  |
| Di-N-nitrosopentamethylenetetramine |  | 2 |  |
| Sodium bicarbonate |  |  | 4 |

28 gms. of these mixes were placed in 1" x ½" x 12" moulds and vulcanised for 30 minutes at 153° C. The stocks were blown to approximately the same extent and both diazoaminobenzene and di-N-nitrosopentamethylenetetramine gave sponges with close, even pores. The structure of the sponge blown with sodium bicarbonate was open and very uneven.

There was very noticeable differences in the colour and staining properties of the sponges. Sponge from mix A was dark red-brown in colour and stained white paper held in contact with it after one day. Sponge from mix B was golden yellow in colour and did not stain a piece of white paper held in contact with it after one month. Sponge from mix C was dark brown in colour but did not stain a piece of white paper held in contact with it after one month.

Example 7

Butyl synthetic rubber (GR-I) was compounded to the following formulae, in which parts are by weight.

|  | A | B |
|---|---|---|
| Butyl rubber (GR-I) | 100 | 100 |
| Petrolatum | 15 | 15 |
| Whiting | 20 | 20 |
| Zinc oxide | 5 | 5 |
| Zinc diethyldithiocarbamate | 1.5 | 1.5 |
| Tetramethylthiuramdisulphide | 1 | 1 |
| Sulphur | 2 | 2 |
| Diazoaminobenzene | 2 | |
| Di-N-nitrosopentamethylenetetramine | | 2 |

28 gms. of these mixes were placed in 1" x ½" x 12" moulds and vulcanised for 2 hours at 153° C. The stocks were blown approximately to the same extent and both sponges had a close, even pore structure.

The colour of the sponge given by mix A was dark brown and when placed in contact with white paper for 24 hours a noticeably brown-yellow staining of the paper was observed.

The sponge from mix B was light fawn in colour and it did not stain white paper when held in contact with it for a period of three weeks.

Example 8

To 100 parts of a laminac resin (an alkyd type resin such as is used for low pressure lamination) was added 2 parts of di-N-nitroso succin-bis-methylamide and 1 part of benzoyl peroxide.

The resulting mixture was heated between glass plates to 100° C. to effect expansion and polymerisation. The product obtained was uniformly expanded and had a specific gravity of 0.45.

We claim:

1. In a process for the preparation of rubber and plastic materials in sponge-like or cellular form in which a heat decomposable substance is incorporated with said material and the mixture is heated to cause formation of cells in the material, the steps which comprise intimately mixing with the material an organic compound selected from the group consisting of di-N-nitrosopentamethylenetetramine, di-N-nitrosopiperazine, trimethylenetrinitrosoamine and succin-bis(N-nitrosomethylamide) and heating the mixture to decompose the said organic compound in the material to produce a cellular structure.

2. The process of claim 1, in which the said organic compound is di-N-nitrosopentamethylenetetramine.

3. The process of claim 1, in which the said organic compound is trimethylenetrinitrosoamine.

4. The process of claim 1, in which the said organic compound is di-N-nitrosopiperazine.

5. In a process for the preparation of rubber materials in sponge-like form in which a heat decomposable substance is incorporated with said material and the mixture is heated to cause formation of cells in the material, the steps which comprise intimately mixing with the material an organic compound selected from the group consisting of di-N-nitrosopentamethylenetetramine, di-N-nitrosopiperazine, trimethylenetrinitrosoamine and succin-bis(N-nitrosomethylamide) and heating the mixture to decompose the said organic compound in the material to produce a cellular structure.

6. The process of claim 5, in which the rubber material is natural rubber.

7. The process of claim 5, in which the rubber material is natural rubber and the organic compound is di-N-nitrosopentamethylenetetramine.

8. The process of claim 5, in which the quantity of organic compound employed is from 2–10% by weight of the rubber material.

ARTHUR STANLEY BRIGGS.
GODFREY EDWARD SCHARFF.

REFERENCES CITED

The following references are of record in the file of this patent:

UNITED STATES PATENTS

| Number | Name | Date |
|---|---|---|
| 1,990,925 | Bennett | Feb. 12, 1935 |
| 2,035,698 | Fisher | Mar. 31, 1936 |
| 2,170,191 | Fisher | Aug. 21, 1939 |
| 2,299,593 | Roberts et al. | Oct. 20, 1942 |
| 2,335,730 | Blake | Nov. 30, 1943 |

OTHER REFERENCES

H. J. Backer Recueil des Travaux Chimiques des Pays, Bas 32, 42.

Richter, Org. Chem. Ind. Ed. Spielman vol. 1 pg. 168.